(12) United States Patent
Barrier

(10) Patent No.: US 7,467,677 B2
(45) Date of Patent: Dec. 23, 2008

(54) CONTROL MECHANISM FOR ZERO TURNING RADIUS MOWER

(76) Inventor: Scott D. Barrier, 2749 E. Sinclair Ct., Cloverdale, IN (US) 46120

( * ) Notice: Subject to any disclaimer, the term of this patent is extended or adjusted under 35 U.S.C. 154(b) by 317 days.

(21) Appl. No.: 11/064,286

(22) Filed: Feb. 23, 2005

(65) Prior Publication Data
US 2005/0183409 A1 Aug. 25, 2005

(51) Int. Cl.
B62D 11/02 (2006.01)

(52) U.S. Cl. ............................ 180/6.48; 180/6.32

(58) Field of Classification Search ............... 180/6.32, 180/6.48; 56/11.1, 11.9, 14.7
See application file for complete search history.

(56) References Cited

U.S. PATENT DOCUMENTS

| | | | | |
|---|---|---|---|---|
| 2,601,752 A * | 7/1952 | Rose | ............... | 56/10.9 |
| 3,611,827 A * | 10/1971 | Bottum et al. | ......... | 74/471 XY |
| 3,616,869 A | 11/1971 | Rilling | | |
| 3,891,042 A * | 6/1975 | Braun | ............... | 180/6.48 |
| 4,399,822 A * | 8/1983 | Theumer | ............... | 600/445 |
| 4,470,475 A * | 9/1984 | Carlson | ............... | 180/6.48 |
| 4,756,101 A * | 7/1988 | Friberg et al. | ............... | 37/244 |
| 4,790,399 A | 12/1988 | Middlesworth | | |
| 4,920,733 A | 5/1990 | Berrios | | |
| 5,077,959 A * | 1/1992 | Wenzel | ............... | 56/11.1 |
| 5,131,483 A | 7/1992 | Parkes | | |
| 5,507,138 A | 4/1996 | Wright et al. | | |
| 5,511,367 A * | 4/1996 | Powers et al. | ............... | 56/11.2 |
| 5,832,703 A | 11/1998 | Evans | | |
| 6,003,401 A * | 12/1999 | Smith | ............... | 74/496 |
| 6,085,504 A * | 7/2000 | Wright et al. | ............... | 56/14.7 |
| 6,257,357 B1 | 7/2001 | Teal et al. | | |
| 6,341,479 B1 * | 1/2002 | Scag et al. | ............... | 56/11.3 |
| 6,434,917 B1 | 8/2002 | Bartel | | |
| 6,460,639 B1 * | 10/2002 | Hori et al. | ............... | 180/6.2 |
| 6,550,563 B2 | 4/2003 | Velke et al. | | |
| 6,560,952 B2 | 5/2003 | Velke et al. | | |
| 6,585,451 B2 | 7/2003 | Wynings | | |
| 6,640,526 B2 | 11/2003 | Velke et al. | | |
| 6,662,895 B1 | 12/2003 | Bednar | | |

* cited by examiner

*Primary Examiner*—Paul N Dickson
*Assistant Examiner*—Maurice Williams
(74) *Attorney, Agent, or Firm*—Woodard, Emhardt, Moriarty, McNett & Henry LLP

(57) ABSTRACT

A mechanism for controlling the movement of a zero turning radius power mower includes a single control arm movable in a forward direction and a rearward direction, and pivotable in a clockwise direction and in a counterclockwise direction. The control arm is connected via a pair of control linkages to a right hydraulic pump and to a left hydraulic pump such that when the control arm is moved in a forward direction the two hydraulic pumps power the drive wheels forward, and when the control arm is moved in a rearward direction the two hydraulic pumps power the drive wheels rearward. When the control arm is pivoted in a clockwise direction the left hydraulic pump powers the left drive wheel forward and the right hydraulic pump powers the right drive wheel rearward. When the control arm is pivoted in a counterclockwise direction the right hydraulic pump powers the right drive wheel forward and the left hydraulic pump powers the left drive wheel rearward.

30 Claims, 4 Drawing Sheets

US 7,467,677 B2

CONTROL MECHANISM FOR ZERO TURNING RADIUS MOWER

FIELD OF THE INVENTION

The present invention relates generally to lawn mowing machines, and more generally to a mechanism for controlling the direction and speed of a zero turning radius lawn mower.

BACKGROUND OF THE INVENTION

Zero turning radius lawn mowers have enjoyed significant commercial success as the benefits of their maneuverability and performance become increasingly known. In a typical embodiment, a zero turning radius mower includes a mower deck mounted on a pair of drive wheels, each of which is independently operated by a hydraulic pump coupled to the mower's engine. A corresponding motor is provided for each drive wheel, each motor being powered and controlled by one of the pumps.

In the embodiments known to date, each pump typically includes a control lever for regulating fluid pressure and direction to its corresponding motor so that the drive wheels can be independently controlled. This allows each drive wheel to be rotated at a variable speed in both the forward and reverse directions. In this manner, the mower may be steered by controlling the speed and direction of the two drive wheels.

Accordingly, the operator can move both control levers forward to drive the mower forward, or can move both levers backward to drive the mower backward. Alternatively, the operator can move one control lever forward while keeping the other in its upright neutral position. This will cause one drive wheel to be driven forward while the other drive wheel remains stationary, enabling the mower to execute a zero radius turn in which the mower pivots about a vertical axis passing through the stationary wheel. Additionally, the operator can move one control lever forward and the other control lever rearward. This causes one drive wheel to be driven forward and the other drive wheel to be driven in reverse, enabling the mower to execute a spin turn in which the vehicle pivots about a vertical axis located midway between the two drive wheels.

As is appreciated by the art, lawn mowers of this type are highly maneuverable. Zero radius turns or spin turns are particularly advantageous when an operator comes to an edge of a yard during mowing operations and wants to turn around and mow in the opposite direction. The operator can simply execute a zero radius turn and begin mowing back in the opposite direction. Furthermore, spin turns are advantageous when mowing in tight spaces or when maneuvering out of confined spaces such as a shed or garage.

In many commercial mowers however, the operator does not sit on the mower but instead walks behind the mower or stands on a platform directly or indirectly attached to the mower deck. This makes the use of the dual control levers somewhat problematic, since the operator must use the control levers to steady himself as the mower turns and bounces over uneven ground. When the mower pitches forward or rolls to one side during operation, the operator may reflexively push one or both of the control arms in an unintended direction, thereby causing the mower to be driven off course.

A need therefore exists for a control mechanism for zero turning radius mowers that is better adapted for use with walk behind or stand-on power mowers. The present invention addresses that need.

SUMMARY OF THE INVENTION

A mechanism for controlling the movement of a zero turning radius power mower includes a single control arm that is movable in a forward direction and a rearward direction, and is pivotable in a clockwise direction and a counterclockwise direction. The single control arm is connected via a pair of control linkages to a right hydraulic pump and to a left hydraulic pump such that when the control arm is moved in a forward direction the two hydraulic pumps power the mower drive wheels forward, and when the control arm is moved in a rearward direction the two hydraulic pumps power the mower drive wheels rearward. When the control arm is pivoted in a clockwise direction the left hydraulic pump powers the left drive wheel forward and the right hydraulic pump powers the right drive wheel rearward. When the control arm is pivoted in a counterclockwise direction the right hydraulic pump powers the right drive wheel forward and the left hydraulic pump powers the left drive wheel rearward.

DESCRIPTION OF THE PREFERRED EMBODIMENTS

Figure 1:
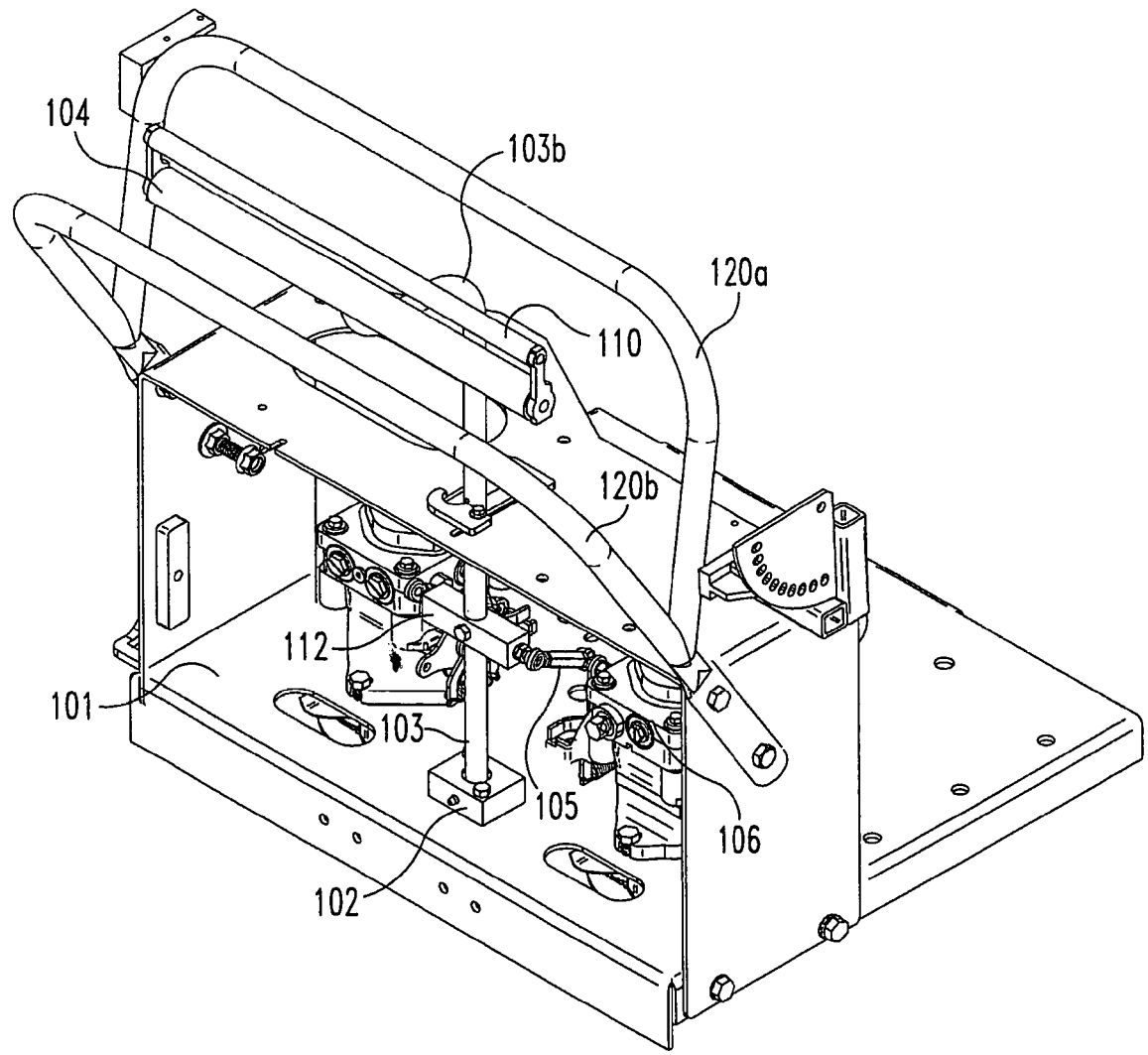
FIG. 1 is a perspective view of the control mechanism of the present invention, according to one preferred embodiment.

For the purposes of promoting an understanding of the principles of the invention, reference will now be made to certain preferred embodiments and specific language will be used to describe the same. It will nevertheless be understood that no limitation of the scope of the invention is thereby intended, such alterations and further modifications of the preferred embodiments being contemplated as would normally occur to one skilled in the art to which the invention relates.

As indicated above, the present invention provides a mechanism to control the movement of a zero-turning radius power mower. The control mechanism utilizes a single control arm to simultaneously control both the right hydraulic pump and the left hydraulic pump. The single control arm may be pushed in one direction (usually forward) to move both the right and left drive wheels forward. The single control arm may be pushed/pulled in another direction (usually backward) to move both the right and left drive wheels backward. The single control arm may be pivoted in one direction (usually counterclockwise) to move the right drive wheel(s) forward and the left drive wheel(s) backward. The single control arm may be pivoted in another direction (usually clockwise) to move the right drive wheel(s) backward and the left drive wheel(s) forward. When the control arm is released, the mower quickly returns to neutral, stopping the movement of the mower. Speed control stops may also be included to limit the motion of the control arm, and thus to limit the maximum speed of the mower in a particular direction.

One preferred embodiment of the invention is illustrated in the attached drawings, with reference numerals being used to identify certain illustrated parts described below.

Figure 2:
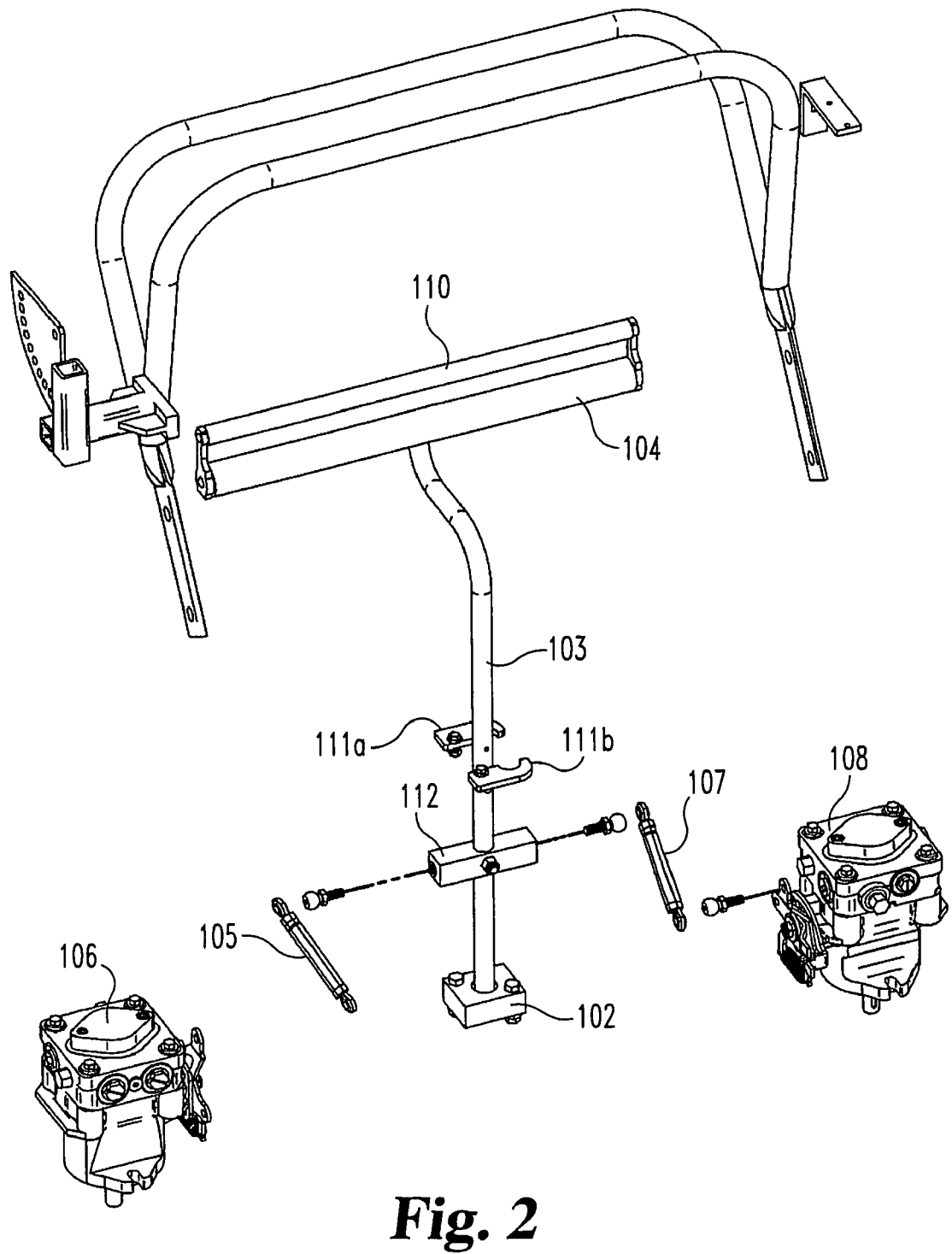
FIG. 2 is an exploded view of the control mechanism of FIG. 1.
Figure 3:
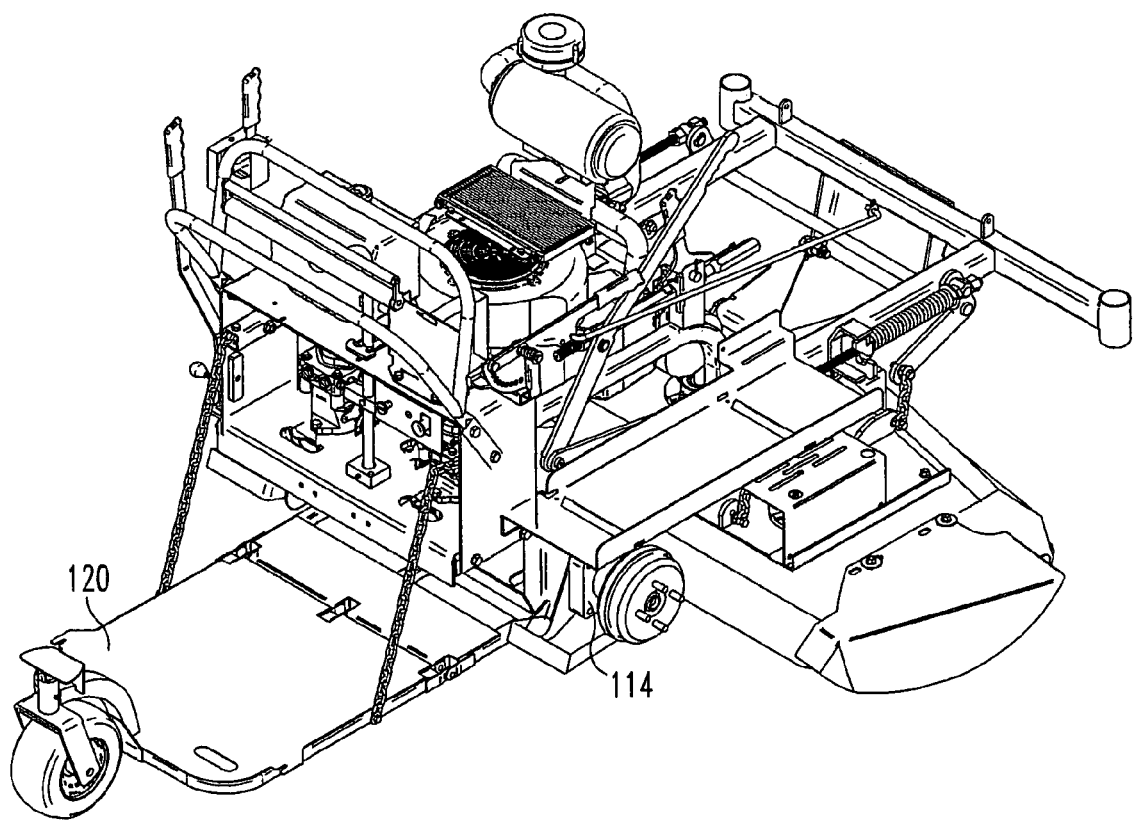
FIG. 3 is a perspective view of the control mechanism of FIG. 1, mounted on a zero turning radius mower.
Figure 4:
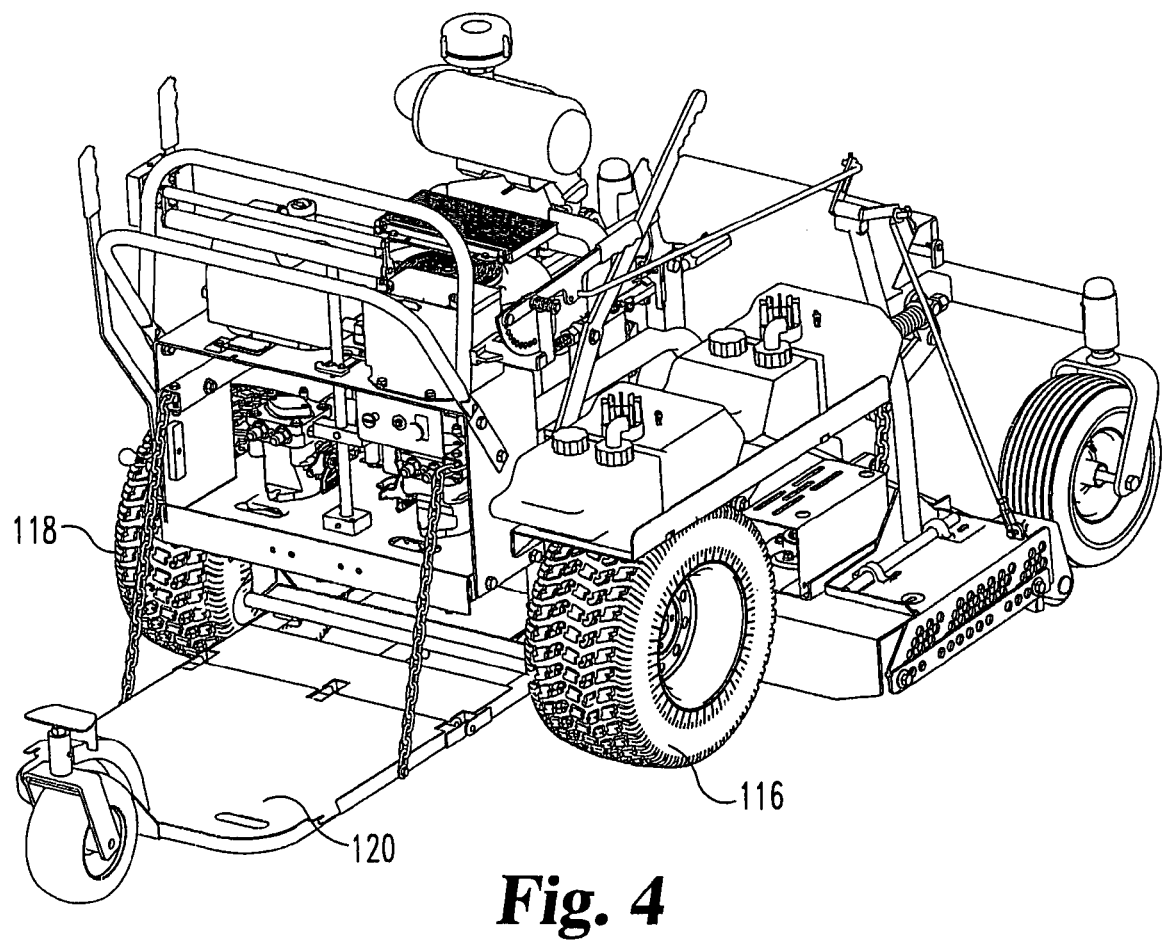
FIG. 4 is a perspective view of the control mechanism of FIG. 1, mounted on a zero turning radius mower.

FIGS. 1 through 4 show perspective and exploded views of a mower control assembly according to one preferred embodiment of the present invention. In those drawings, the inventive control assembly is mounted on a support plate 101. The illustrated plate 101 is an engine plate on which the engine and pumps, etc., are mounted, but it may alternatively be another plate, deck, or support structure, including the mower deck to which cutting blades are attached. In all cases, of course, it is at least indirectly attached to the mower deck.

A control arm ball joint 102, including a bearing retainer with a ball joint bearing therein, may be attached to support plate 101 as shown. A single control arm 103 may then be attached to plate 101 through control arm ball joint 102. The control arm ball joint holds the lower end of the control arm in a relatively fixed position while allowing the upper portion of the control arm to deflect forward or backward. The control arm ball joint allows the control arm to pivot (turn) in either a clockwise or counterclockwise direction. A bearing bushing may be mounted to the control arm to control wear.

The upper end of control arm 103 may terminate in a control handle 104. Control handle 104 is used to manipulate control arm 103 as described herein. Control handle 104 is particularly useful for pivoting control arm 103 to move one side of the mower forward, and the other side of the mower backward. The upper end of control arm 103 may include one or more bends 103b so that control handle 104 is offset relative to the lower end of control arm 103. This allows the controls to be positioned closer to the rear of the unit for operational comfort.

A first control linkage 105 and a second control linkage 107 are connected to control arm 103. First control linkage 105 is operably connected to a first hydraulic pump 106, and second control linkage 106 is operably connected to a second hydraulic pump 108. The two control linkages connect control arm 103 to each hydraulic pump (right and left) so that deflection of the control arm will activate the two hydraulic pumps simultaneously to move each side of the mower in the desired direction. The pumps are typically powered by an internal combustion engine, which also powers the cutting blade(s), as is generally known to the art.

A control arm linkage block 112 may be used to connect the control arm 103 and the two control arm linkages 105 and 107 at the proper height. As shown in the drawings, control arm linkage block 112 may be mounted to the control arm at the height most effective to provide smoothness and ease of operation.

As is known to the art, hydraulic pumps 106 and 108 may be variable displacement axial piston hydraulic pumps that can vary the pump discharge rate from zero flow (neutral) up to a maximum flow or a reverse direction of flow. These variable flow rates take the place of a transmission and a clutch in traditional power transmission schemes. In drive wheel steering, the flow rates to the wheel motors control the turning direction and speed of the wheels.

Accordingly, hydraulic pumps 106 and 108 are each operably connected to a reversible hydraulic drive wheel motor (right drive wheel motor 114 being shown), and through the drive wheel motor to a drive wheel, as is known to the art. Movement of the control arm 103 thus effectively causes each drive wheel to move in either a forward or a backward direction, as control arm 103 operates the two hydraulic pumps 106 and 108 through control arm linkages 105 and 107 to operate dive wheel motors and thus the two drive wheels.

As indicated above, each of the two hydraulic pumps is preferably equipped with a "return-to-neutral" mechanism so that the pump discharge rate will be biased to zero when the control arm is not intentionally deflected or pivoted in any direction. Each return-to-neutral mechanism preferably includes at least one spring, with the spring tension being selected to facilitate easy operation of the mower and true return-to-neutral capability. In the most preferred embodiment the hydraulic pumps are Hydro-Gear® pumps equipped with springs sized and configured to provide a spring tension of between 4.5 lbs/in$^2$ and 5.5 lbs/in$^2$. More preferably the springs provide a spring tension of about 5 bs/in$^2$, with a spring tension of 4.991 lbs/in$^2$ being most preferred to facilitate easy, effective, and true return-to-neutral operation.

As described above, the operation of the mower proceeds as follows. Single control arm 103 may be pushed forward to move both the right drive wheel 116 and the left drive wheel 118 forward. Single control arm 103 may be pulled backward to move both the right drive wheel 116 and the left drive wheel 118 backward. Single control arm 103 may be pivoted counterclockwise to move right drive wheel 116 forward and left drive wheel 118 backward. Single control arm 103 may be pivoted clockwise to move right drive wheel 116 backward and left drive wheel 118 forward. When control arm 103 is released, the mower quickly returns to neutral, stopping the movement of the mower.

In some embodiments a handle bar 120a or 120b is included on the mower to help steady the operator's hands, to provide comfort during the operation of unit, and to protect the controls.

A trim speed control 110 may be used during trim mowing to reduce speed of machine will throttle at full rpm. The trim speed control is movable so that it can be positioned between the control handle and either section of the handlebar. It thus acts to limit or even prevent the deflection of the control arm in one or more directions, thereby preventing the mower from moving at top speed in that direction.

One or more control arm limiters 111a and 111b may also be included to limit the travel/deflection of the control arm in the reverse and/or forward directions. This limits the top speed of the mower in one or more directions.

A platform 120 upon which an operator may stand while operating the mower is also preferably included. The platform may include one or more wheels, and may be positionable to a first, horizontal position for use by a mower operator, and may also be positionable to a second, upright position so that the operator may walk behind the mower instead of standing on the platform.

While certain aspects of the invention have been described in detail in the drawings and foregoing description, the same are to be considered illustrative of the claimed invention and not limiting, it being understood that all variations and modifications that come within the spirit of the invention are desired to be protected.

What is claimed:

1. A mechanism for controlling the movement of a zero turning radius power mower, wherein said zero turning radius power mower comprises a mower deck powered by at least one pair of drive wheels, the mechanism comprising:

a) a control arm movable in a forward direction and a rearward direction, and pivotable in a clockwise direction and in a counterclockwise direction;

b) a first-hydraulic pump operably connected to a first drive wheel;

c) a first control linkage connecting said control arm to said first hydraulic pump, wherein said first control linkage causes said first hydraulic pump to power said first drive wheel forward when said control arm is moved in a forward direction, and wherein said first control linkage causes said first hydraulic pump to power said first drive wheel forward when said control arm is pivoted in a counterclockwise direction, and wherein said first control linkage causes said first hydraulic pump to power said first drive wheel rearward when said control arm is moved in a rearward direction, and wherein said first control linkage causes said first hydraulic pump to power said first drive wheel rearward when said control arm is pivoted in a clockwise direction;

d) a second hydraulic pump operably connected to said second drive wheel;

e) a second control linkage connecting said control arm to said second hydraulic pump wherein said second control linkage causes said second hydraulic pump to power said second drive wheel forward when said control arm is moved in a forward direction, and wherein said second control linkage causes said second hydraulic pump to power said second drive wheel forward when said control arm is pivoted in a clockwise direction, and wherein said second control linkage causes said second hydraulic pump to power said second drive wheel rearward when said control arm is moved in a rearward direction, and wherein said second control linkage causes said second hydraulic pump to power said second drive wheel rearward when said control arm is pivoted in a counterclockwise direction; and f) a control arm linkage block to connect said control arm to said first control linkage and to said second control linkage at a proper height, wherein a said mechanism further includes a trim speed control mechanism mounted horizontally above said control arm handle.

2. A mechanism according to claim 1 wherein said control arm has a first, lower end connected to a support plate which is directly or indirectly attached to said mower deck.

3. A mechanism according to claim 2 wherein said control arm is connected to said support plate by a ball joint.

4. A mechanism according to claim 1 wherein said control arm has a second, upper end terminating in a control arm handle effective to pivot said control arm.

5. A mechanism according to claim 1 wherein said control arm handle is generally horizontal.

6. A mechanism according to claim 1 wherein said mechanism further includes a control arm limiter to limit the travel/deflection of the control arm.

7. A mechanism according to claim 1 wherein said first hydraulic pump and said second hydraulic pump are each equipped with a return-to-neutral mechanism.

8. A zero turning radius power mower comprising:
a) a mower deck supporting a rotatable mower blade, said mower deck having a right side and a left side;
b) a right drive wheel effective for moving the right side of the mower deck;
c) a left drive wheel effective for moving the left side of the mower deck;
d) a control arm movable in a forward direction and a rearward direction, and pivotable in a clockwise direction and in a counterclockwise direction;
e) a first hydraulic pump operably connected to said right drive wheel;
f) a first control linkage connecting said control arm to said first hydraulic pump, wherein said first control linkage causes said first hydraulic pump to power said right drive wheel forward when said control arm is moved in a forward direction, and wherein said first control linkage causes said first hydraulic pump to power said right drive wheel forward when said control arm is pivoted in a counterclockwise direction, and wherein said first control linkage causes said first hydraulic pump to power said right drive wheel rearward when said control arm is moved in a rearward direction, and wherein said first control linkage causes said first hydraulic pump to power said right drive wheel rearward when said control arm is pivoted in a clockwise direction;

g) a second hydraulic pump operably connected to said second drive wheel;

h) a second control linkage connecting said control arm to said second hydraulic pump wherein said second control linkage causes said second hydraulic pump to power said left drive wheel forward when said control arm is moved in a forward direction, and wherein said second control linkage causes said second hydraulic pump to power said left drive wheel forward when said control arm is pivoted in a clockwise direction, and wherein said second control linkage causes said second hydraulic pump to power said left drive wheel rearward when said control arm is moved in a rearward direction, and wherein said second control linkage causes said second hydraulic pump to power said left drive wheel rearward when said control arm is pivoted in a counterclockwise direction; and i) a control arm linkage block to connect said control arm to said first control linkage and to said second control linkage at a proper height;

wherein said mechanism further includes a trim speed control mechanism mounted horizontally above said control arm handle.

9. A mower according to claim 8 wherein said control arm has a first, lower end connected to a support plate which is directly or indirectly attached to said mower deck.

10. A mower according to claim 9 wherein said control arm is connected to said support plate by a ball joint.

11. A mower according to claim 8 wherein said control arm has a second, upper end terminating in a control arm handle effective to pivot said control arm.

12. A mower according to claim 8 wherein said control arm handle is generally horizontal.

13. A mower according to claim 8 wherein said mechanism further includes at least one control arm limiter to limit the travel of the control arm in either or both of the forward and rearward directions.

14. A mower according to claim 8 wherein said first hydraulic pump and said second hydraulic pump are each equipped with a return-to-neutral mechanism.

15. A mechanism for controlling the movement of a zero turning radius power mower, wherein said zero turning radius power mower comprises a mower deck powered by at least one pair of drive wheels, the mechanism comprising:
a) a control arm movable in a forward direction and a rearward direction, and pivotable in a clockwise direction and in a counterclockwise direction;
b) a first hydraulic pump operably connected to a first drive wheel;
c) a first control linkage connecting said control arm to said first hydraulic pump, wherein said first control linkage causes said first hydraulic pump to power said first drive wheel forward when said control arm is moved in a forward direction, and wherein said first control linkage causes said first hydraulic pump to power said first drive wheel forward when said control arm is pivoted in a counterclockwise direction, and wherein said first control linkage causes said first hydraulic pump to power said first drive wheel rearward when said control arm is moved in a rearward direction, and wherein said first control linkage causes said first hydraulic pump to power said first drive wheel rearward when said control arm is pivoted in a clockwise direction;

d) a second hydraulic pump operably connected to said second drive wheel;

e) a second control linkage connecting said control arm to said second hydraulic pump wherein said second control linkage causes said second hydraulic pump to power said second drive wheel forward when said control arm is moved in a forward direction, and wherein said second control linkage causes said second hydraulic pump to power said second drive wheel forward when said control arm is pivoted in a clockwise direction, and wherein said second control linkage causes said second hydraulic pump to power said second drive wheel rearward when said control arm is moved in a rearward direction, and wherein said second control linkage causes said second hydraulic pump to power said second drive wheel rearward when said control arm is pivoted in a counterclockwise direction; and f) a trim speed control mechanism mounted horizontally above said control arm handle.

16. A mechanism according to claim 15 wherein said control arm has a first, lower end connected to a support plate which is directly or indirectly attached to said mower deck.

17. A mechanism according to claim 16 wherein said control arm is connected to said support plate by a ball joint.

18. A mechanism according to claim 15 wherein said control arm has a second, upper end terminating in a control arm handle effective to pivot said control arm.

19. A mechanism according to claim 15 wherein said control arm handle is generally horizontal.

20. A mechanism according to claim 15 wherein said mechanism further includes a control arm linkage block to connect said control arm to said first control linkage and to said second control linkage at a proper height.

21. A mechanism according to claim 15 wherein said mechanism further includes a control arm limiter to limit the travel/deflection of the control arm.

22. A mechanism according to claim 15 wherein said first hydraulic pump and said second hydraulic pump are each equipped with a return-to-neutral mechanism.

23. A zero turning radius power mower comprising:

a) a mower deck supporting a rotatable mower blade, said mower deck having a right side and a left side;

b) a right drive wheel effective for moving the right side of the mower deck;

c) a left drive wheel effective for moving the left side of the mower deck;

d) a control arm movable in a forward direction and a rearward direction, and pivotable in a clockwise direction and in a counterclockwise direction;

e) a first hydraulic pump operably connected to said right drive wheel;

f) a first control linkage connecting said control arm to said first hydraulic pump, wherein said first control linkage causes said first hydraulic pump to power said right drive wheel forward when said control arm is moved in a forward direction, and wherein said first control linkage causes said first hydraulic pump to power said right drive wheel forward when said control arm is pivoted in a counterclockwise direction, and wherein said first control linkage causes said first hydraulic pump to power said right drive wheel rearward when said control arm is moved in a rearward direction, and wherein said first control linkage causes said first hydraulic pump to power said right drive wheel rearward when said control arm is pivoted in a clockwise direction;

g) a second hydraulic pump operably connected to said second drive wheel;

h) a second control linkage connecting said control arm to said second hydraulic pump wherein said second control linkage causes said second hydraulic pump to power said left drive wheel forward when said control arm is moved in a forward direction, and wherein said second control linkage causes said second hydraulic pump to power said left drive wheel forward when said control arm is pivoted in a clockwise direction, and wherein said second control linkage causes said second hydraulic pump to power said left drive wheel rearward when said control arm is moved in a rearward direction, and wherein said second control linkage causes said second hydraulic pump to power said left drive wheel rearward when said control arm is pivoted in a counterclockwise direction; and i) a trim speed control mechanism mounted horizontally above said control arm handle.

24. A mower according to claim 23 wherein said control arm has a first, lower end connected to a support plate which is directly or indirectly attached to said mower deck.

25. A mower according to claim 24 wherein said control arm is connected to said support plate by a ball joint.

26. A mower according to claim 23 wherein said control arm has a second, upper end terminating in a control arm handle effective to pivot said control arm.

27. A mower according to claim 23 wherein said control arm handle is generally horizontal.

28. A mower according to claim 23 wherein said mechanism further includes a control arm linkage block to connect said control arm to said first control linkage and to said second control linkage at a proper height.

29. A mower according to claim 23 wherein said mechanism further includes at least one control arm limiter to limit the travel of the control arm in either or both of the forward and rearward directions.

30. A mower according to claim 23 wherein said first hydraulic pump and said second hydraulic pump are each equipped with a return-to-neutral mechanism.

* * * * *